March 21, 1967  H. B. EGLESTON ETAL  3,309,841
SELECTIVE TOP HEATER FOR PLASTIC COATED PAPERBOARD
CONTAINER PACKAGING MACHINES
Filed May 18, 1964  7 Sheets-Sheet 1

INVENTORS
MELVIN W. MILLER
HARRY B. EGLESTON
BY
Bower & Patalidis
ATTORNEYS

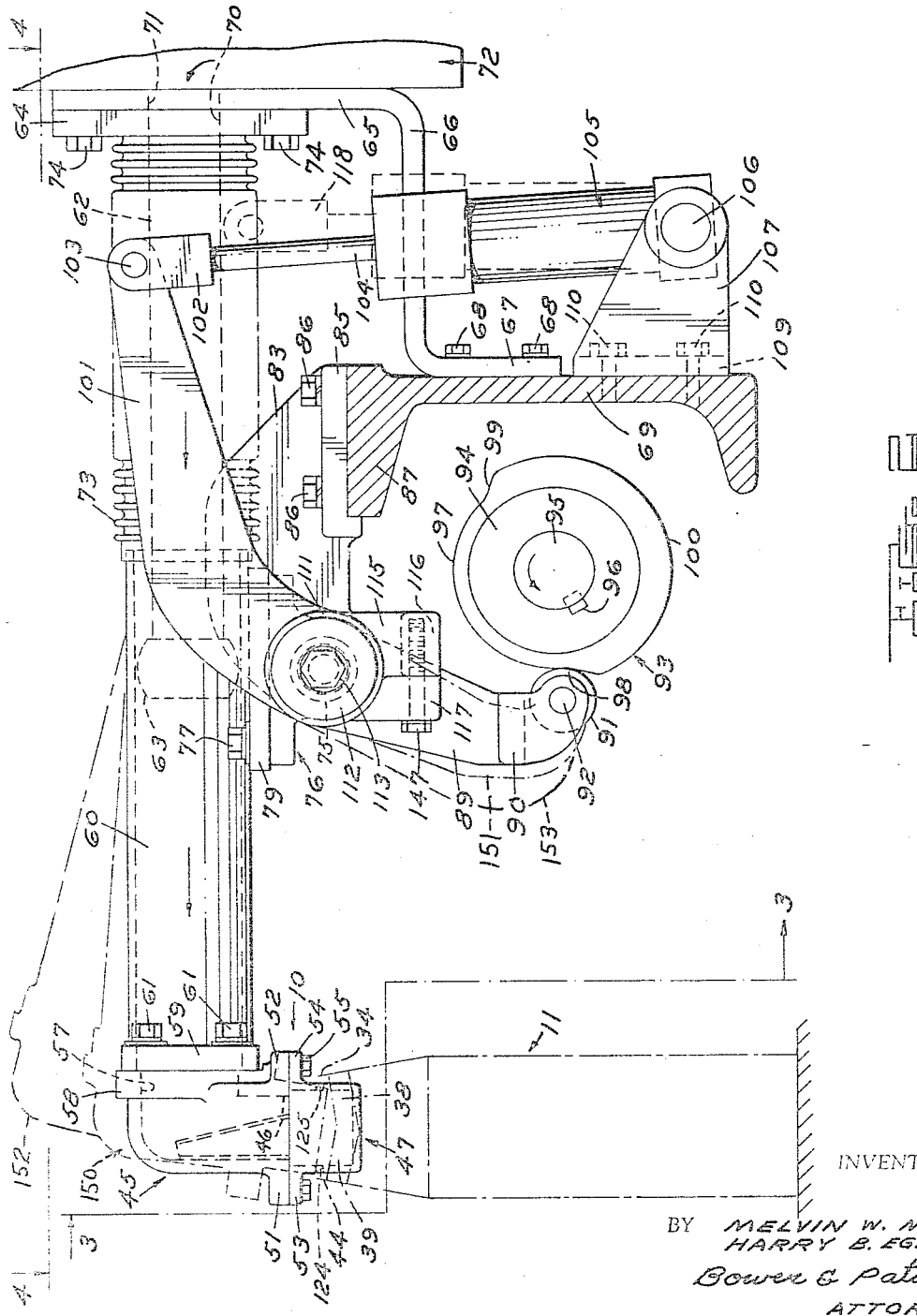

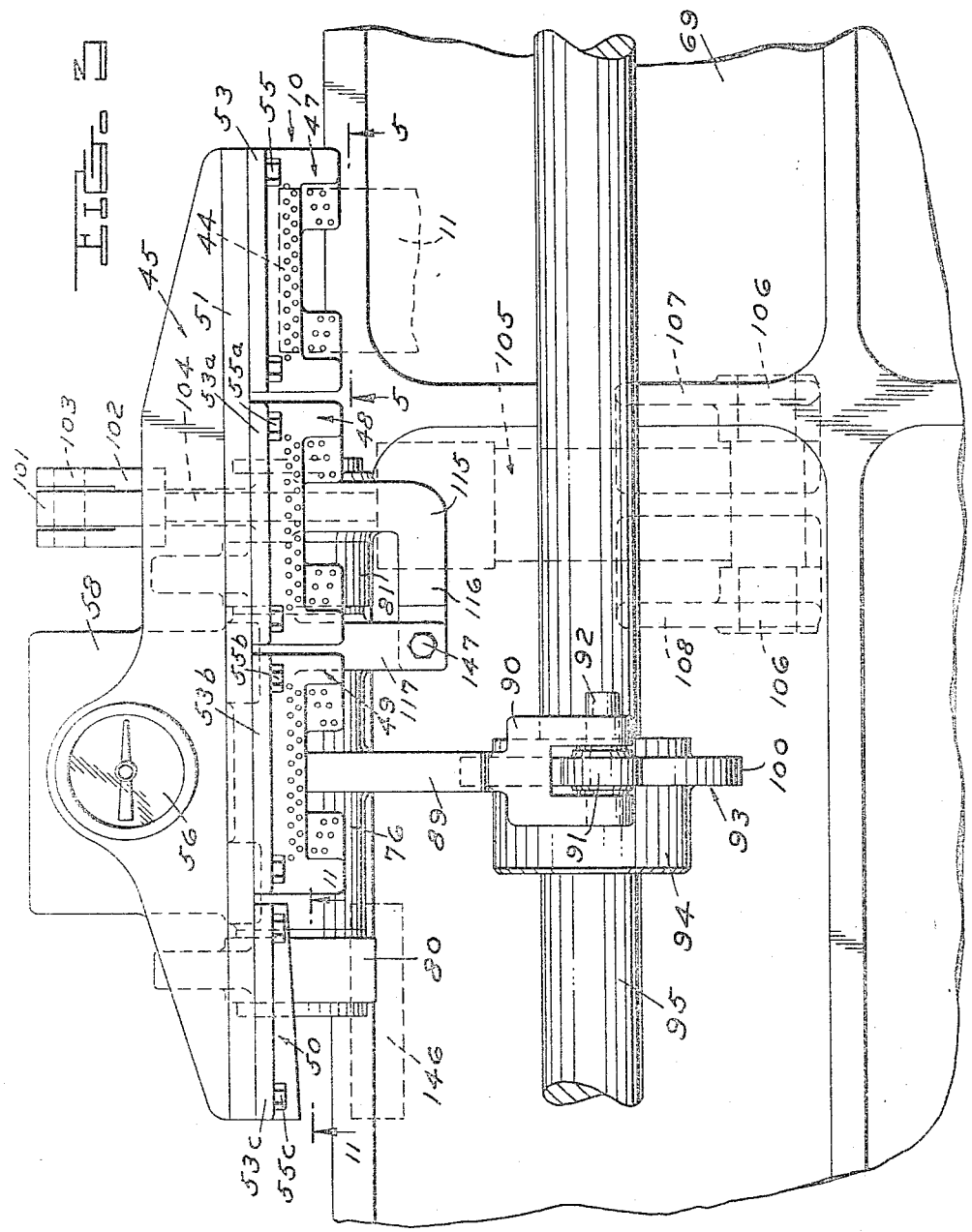

March 21, 1967     H. B. EGLESTON ET AL     3,309,841
SELECTIVE TOP HEATER FOR PLASTIC COATED PAPERBOARD
CONTAINER PACKAGING MACHINES
Filed May 18, 1964     7 Sheets-Sheet 4
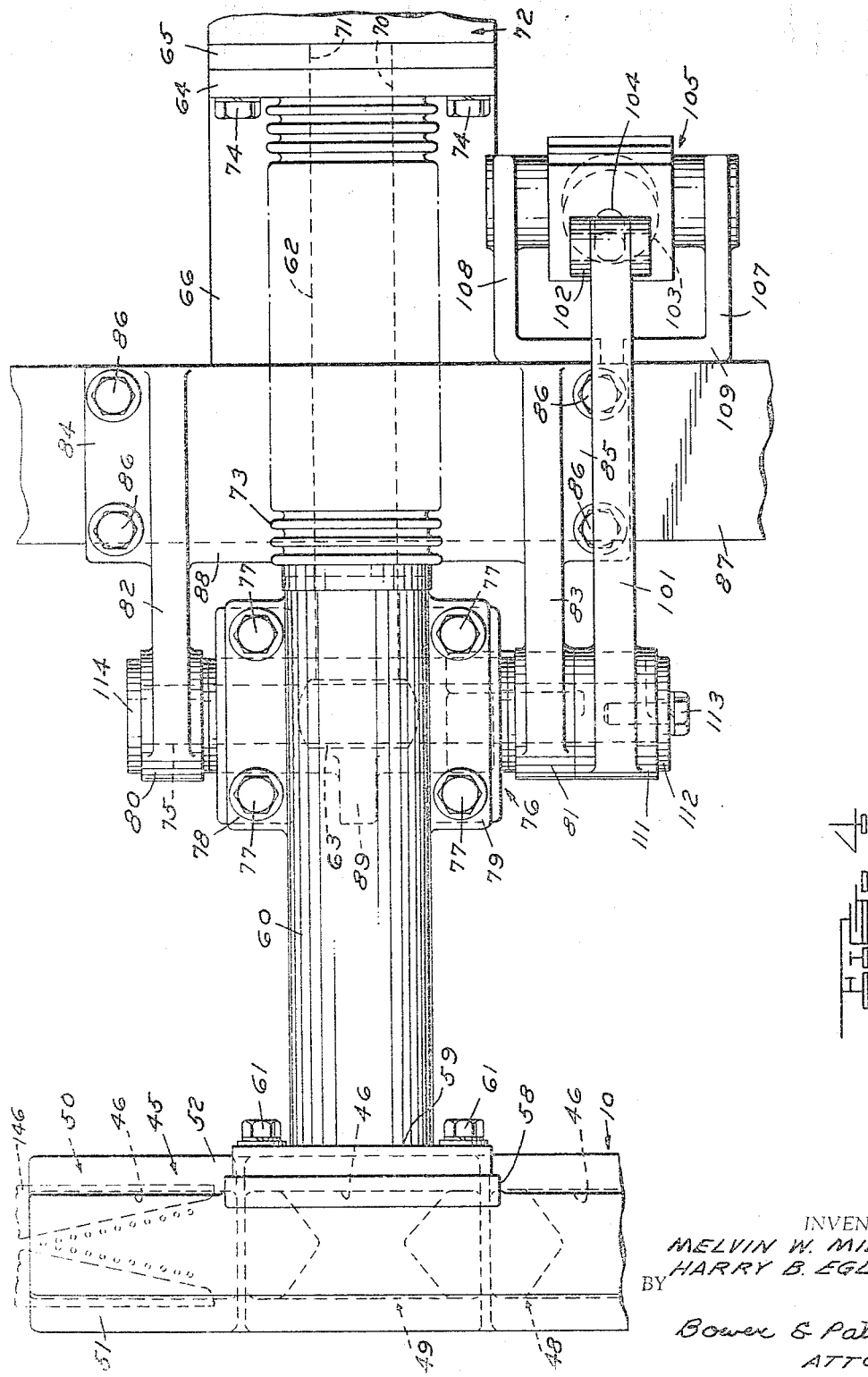
INVENTORS
MELVIN W. MILLER
HARRY B. EGLESTON
BY
Bower & Patolidis
ATTORNEYS

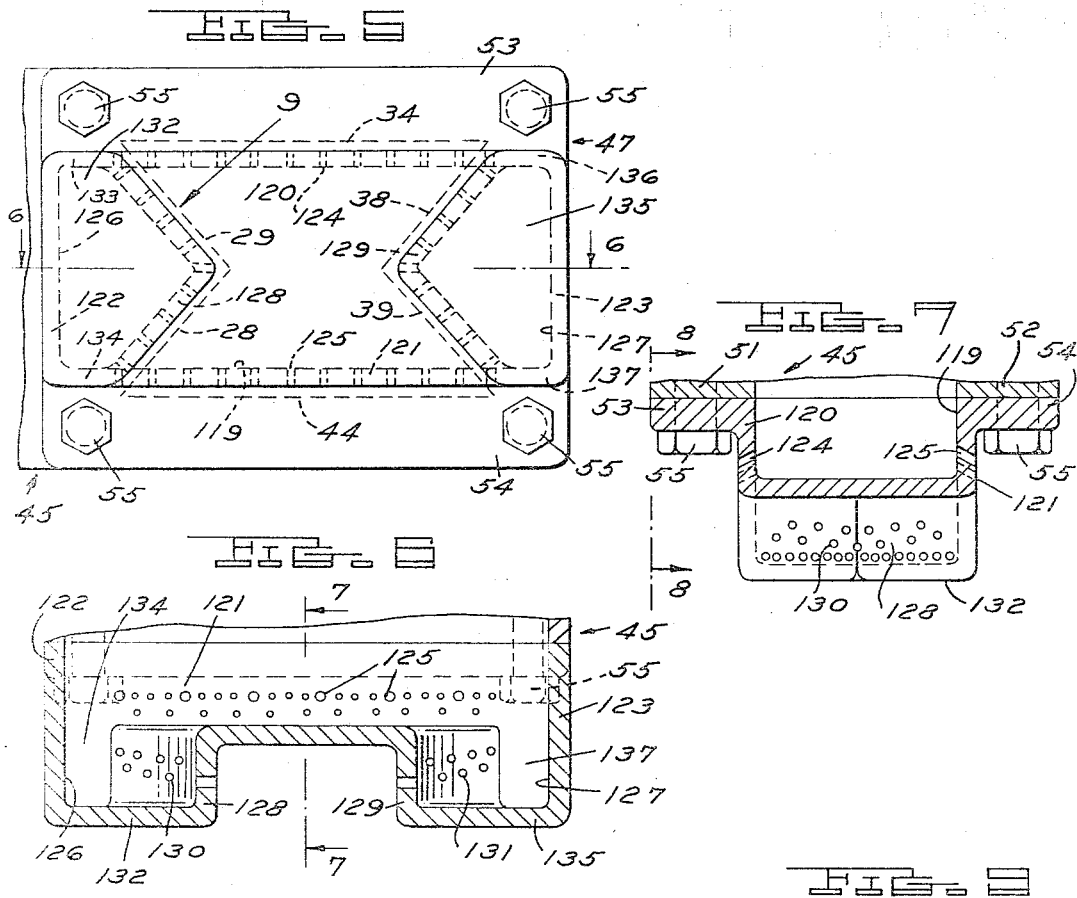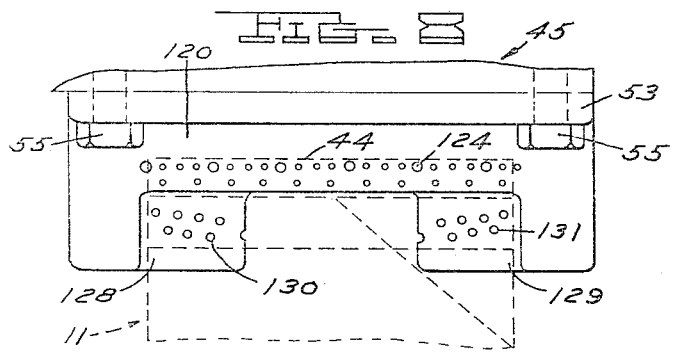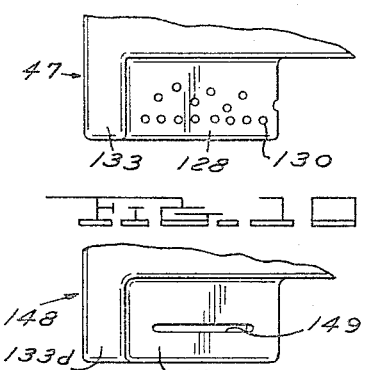

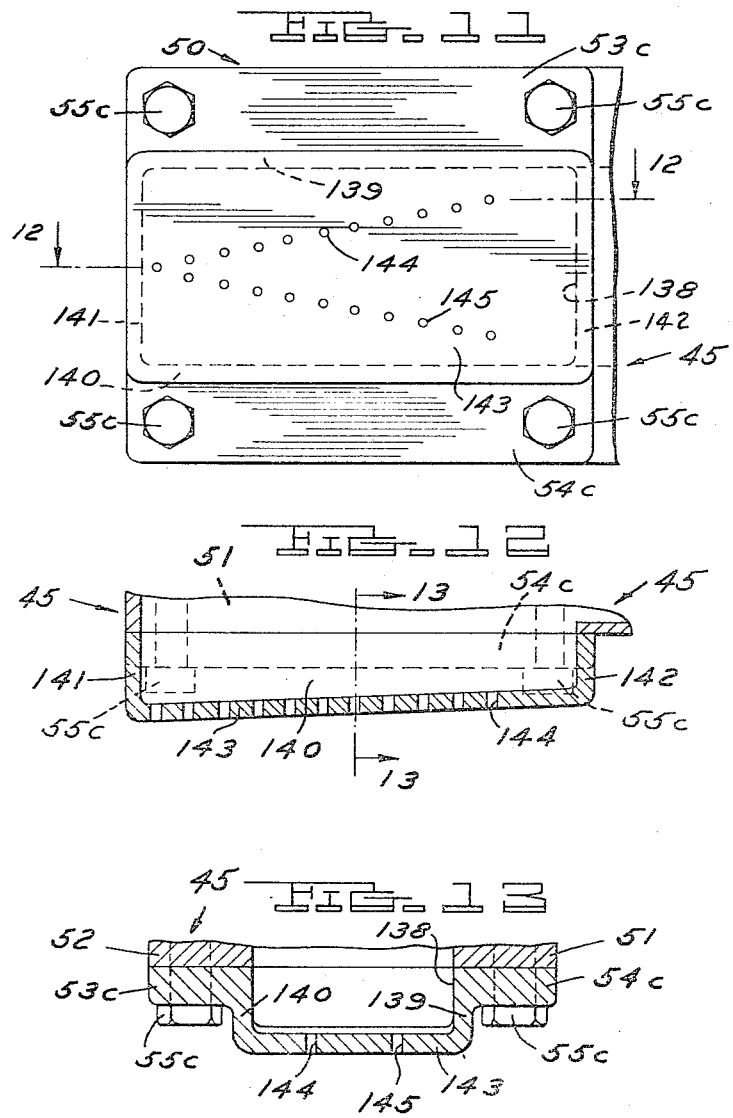

United States Patent Office 3,309,841
Patented Mar. 21, 1967

3,309,841
SELECTIVE TOP HEATER FOR PLASTIC COATED PAPERBOARD CONTAINER PACKAGING MACHINES
Harry B. Egleston, Livonia, and Melvin W. Miller, Detroit, Mich., assignors to Ex-Cell-O Corporation
Filed May 18, 1964, Ser. No. 368,430
16 Claims. (Cl. 53—373)

This invention relates generally to packaging machines, and more particularly to an improved selective top heater for use in container packaging machines for selective heating of the sealing areas of thermoplastic coated paperboard containers.

At the present time it is a common practice in the automatic container packaging machine art to employ containers made from scored paper blanks coated with a heat and pressure sensitive thermoplastic substance, such as polymer polyethylene. However, experience has shown that it is difficult to obtain a proper sealing of the top closure panels of such containers with the prior art top heaters presently employed in container packaging machines. The prior art top heaters for heating the top closure panels of such containers merely pass over the tops of the closure panels and heat these panels in an indiscriminate manner and in such a way as to cause the thermoplastic substance, in most cases, to melt on the inside areas of said closure panels causing said areas to adhere to one another and to result in torn and frayed edges on the pouring spouts of these containers when they are opened. This causes dripping and leaking of the contents when poured from the container. Accordingly, it is the primary object of the present invention to provide an improved and efficient top heater for use in container packaging machines employing thermoplastic coated paperboard containers, to selectively heat predetermined sealing areas on the top closure panels of the containers and prevent the non-sealing inside areas of the panels from adhering together.

It is another object of the present invention to provide a novel and improved top heater for selective heating of predetermined sealing areas on the top closure panels of a thermoplastic coated paperboard container which is provided with heater heads adapted to extend down into the containers in close proximity to the predetermined sealing areas for heating these areas to soften the thermoplastic for a subsequent pressure sealing operation.

It is a further object of the present invention to provide a novel and improved hot air top heater for accurate control of the heating of the top closure panel sealing areas of a thermoplastic coated paperboard container and which permits the use of lower hot air pressures than has been possible heretofore with the prior art hot air heaters, and which is further adapted to be used in container packaging machines wherein the containers are moving continuously or in a step-by-step manner past the heater.

It is still another object of the present invention to provide a novel and improved method of heating certain areas of the top closure panels of a thermoplastic coated paperboard container which comprises the application of a predetermined pattern of heat to the container at said certain areas where a seal is needed when the container is closed.

It is still a further object of the present invention to provide a heating means for use on thermoplastic coated containers as they are moved by a conveyor in a container packaging machine for heating the sealing areas on the container closure top panels and wherein said heating means comprises, a hot air housing adapted to be disposed over the container conveyor, at least one hot air heater head mounted on said housing and provided with a plurality of hot air discharge holes arranged in a predetermined pattern, means for supplying hot air to said housing, means for pivotally supporting said housing on the packaging machine for upward and downward movement, means for pivoting the housing downwardly to move the heater head into a container on the conveyor for applying hot air to the sealing areas on the container top closure panels and for maintaining the heater head in the container for a period of dwell time, and then pivoting said housing upwardly to move the heater head from the container to permit movement of the container to a pressure closing station.

Other objects, features and advantages of this invention will be apparent from the following detailed description, appended claims, and the accompanying drawings.

In the drawings:

FIG. 2 is a fragmentary, elevational sectional view of the structure illustrated in FIG. 1, with parts removed, taken along the line 2—2 thereof, looking in the direction of the arrows, and showing a right end elevational view of the selective top heater;

FIG. 3 is a front elevational view of the selective top heater of the present invention, taken along the line 3—3 of FIG. 2, looking in the direction of the arrows, and showing a part of a container packaging machine;

FIG. 4 is a partial, top plan view of the selective top heater and packaging machine structure illustrated in FIG. 2, taken along the line 4—4 thereof, and looking in the direction of the arrows;

FIG. 5 is an enlarged bottom plan view of the lead heater head on the selective top heater shown in FIG. 3, taken along the line 5—5 thereof, and looking in the direction of the arrows;

FIG. 6 is a longitudinal sectional view of the heater head illustrated in FIG. 5, taken along the line 6—6 thereof, and looking in the direction of the arrows;

FIG. 7 is a transverse sectional view of the heater head illustrated in FIG. 6, taken along the line 7—7 thereof, and looking in the direction of the arrows;

FIG. 8 is a side elevational view of the heater head illustrated in FIG. 7, taken along the line 8—8 thereof, and looking in the direction of the arrows;

FIG. 9 is a fragmentary, elevational view of the heater head illustrated in FIG. 5, taken in the direction of the arrow marked "9";

FIG. 10 is a fragmentary, elevational view, similar to FIG. 9, and showing a modified heater head provided with a slot opening;

FIG. 11 is an enlarged bottom plan view of the rear or last heater head shown in FIG. 3, taken along the line 11—11 thereof, and looking in the direction of the arrows;

FIG. 12 is a longitudinal sectional view of the heater head illustrated in FIG. 11, taken along the line 12—12 thereof, and looking in the direction of the arrows;

FIG. 13 is a transverse sectional view of the heater head illustrated in FIG. 12, taken along the line 13—13 thereof, and looking in the direction of the arrows;

Figure 14:
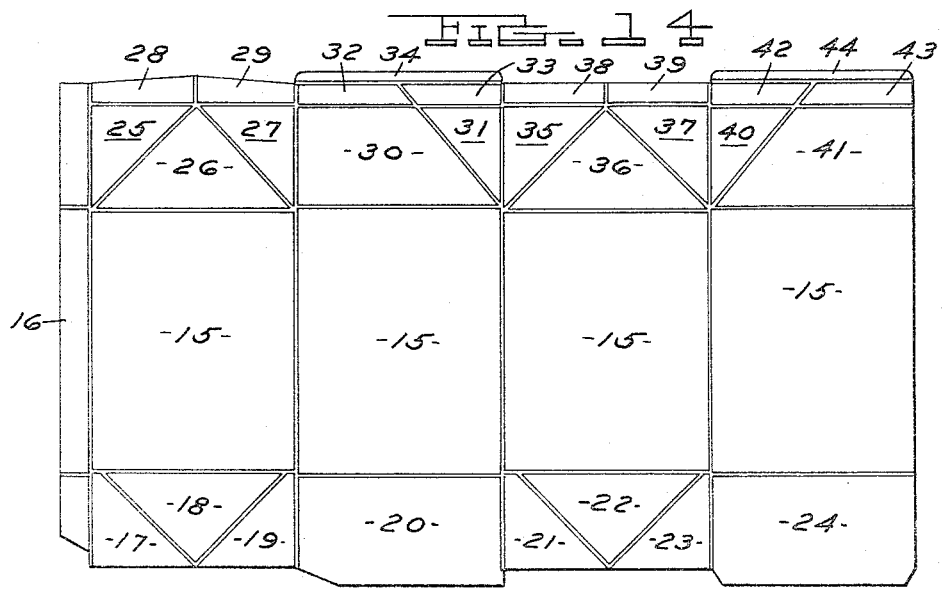
Figure 15:
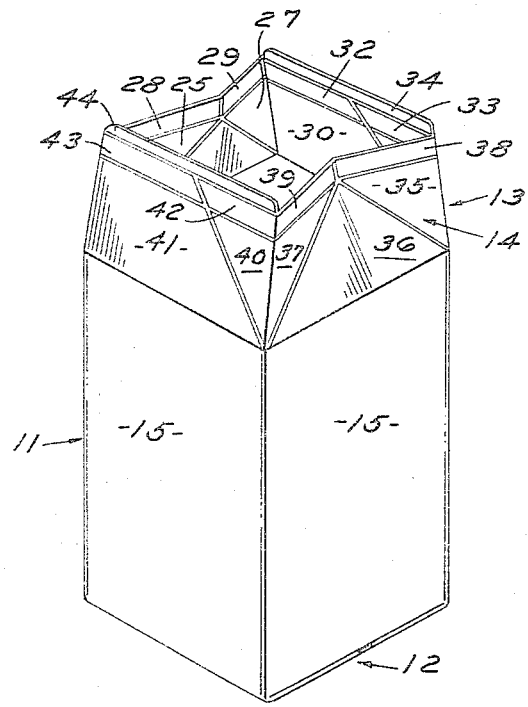

FIG. 14 is a layout view of the inside surface of a plastic coated paperboard blank for use in forming a container of the type adapted to have the top closure panels heated by the selective top heater of the present invention; and FIG. 15 is a perspective view of a container formed from a plastic coated paperboard blank of the type shown in FIG. 3, and showing the top closure panels in position for the heating of specific surfaces of these panels by the use of the selective top heater of the present invention.

Figure 1:
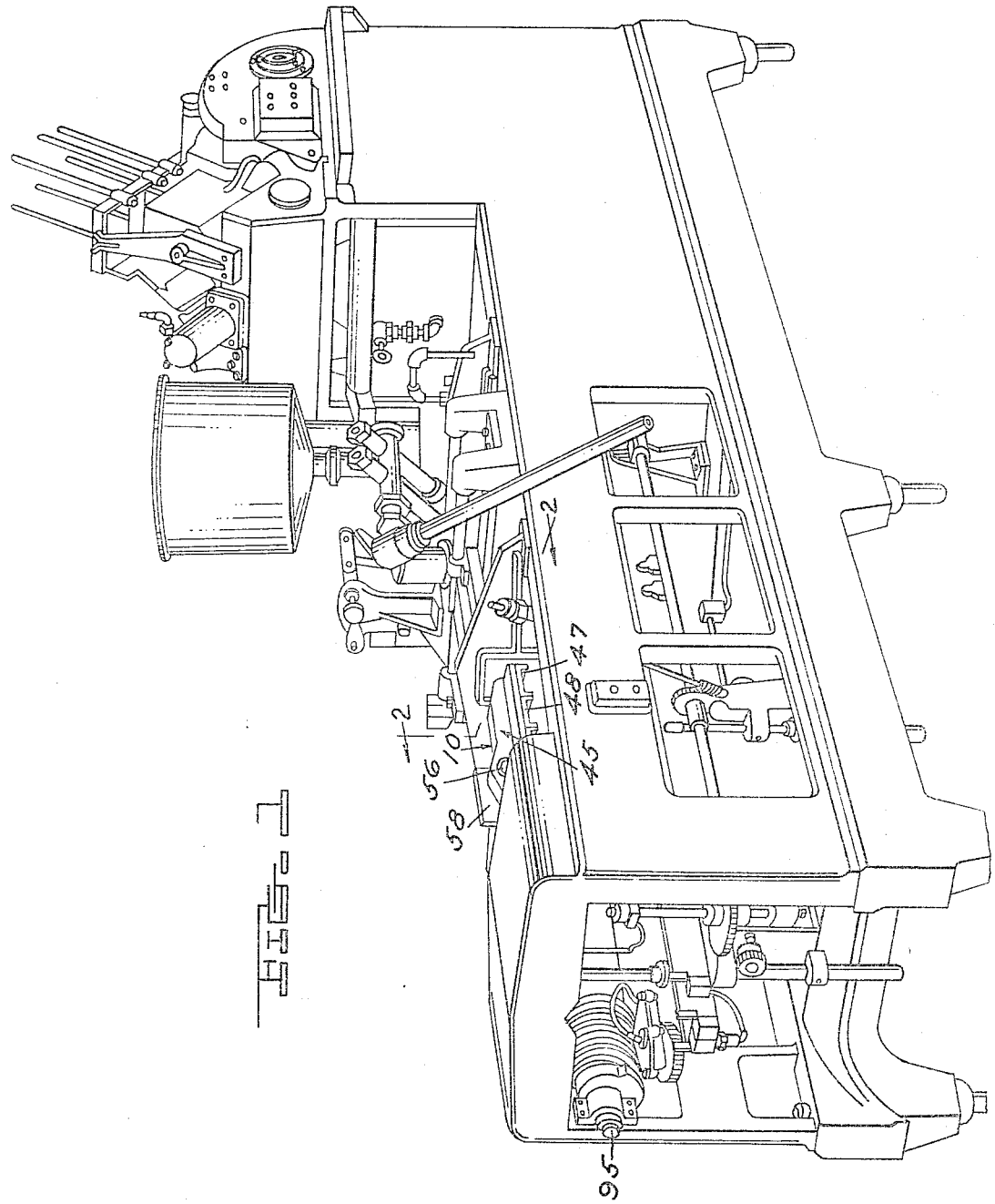
FIG. 1 is a perspective view of a plastic coated paperboard container packaging machine provided with a selective top heater made in accordance with the principles of the present invention.

Referring now to the drawings, an illustrative embodiment of the selective top heater of the present invention is shown in use on a container packaging machine that functions in a step-by-step manner, but it will be understood that it may also be used on a container packaging machine that operates in a continuous manner. A perspective view of the illustrative container packaging machine is shown in FIG. 1. A container packaging machine of the type illustrated in FIG. 1 is disclosed in detail in United States Patent No. 3,002,328, issued October 3, 1961, to Charles Z. Monroe and Harry B. Egleston.

The selective top heater of the present invention is generally indicated by the numeral 10 in FIGS. 1, 2 and 3. The type of container which is erected, filled and closed by the container packaging machine illustrated in FIG. 1 is shown in FIG. 14 and is indicated generally by the numeral 11. The container 11 is provided with a suitable thermoplastic coating. One example of a suitable thermoplastic for coating the container 11 is polymer polyethylene. As shown in FIG. 14, the container 11 comprises a tubular body which is generally rectangular in cross section and provided with a suitable bottom closure generally indicated by the numeral 12. The upper end of the container body terminates in the usual top end closure, generally indicated by the numeral 13, which has incorporated therein an extensible pouring spout 14 for use in dispensing the contents of the container 11.

Containers of the type illustrated in FIG. 14 usually are formed from a blank of paperboard. The paperboard blank from which the container 11 is formed is illustrated in FIG. 13 and is divided into a plurality of panels which are adapted to form the walls and the closure members of the container. The panels are formed by score lines. The body portion of the container 11 is formed by the four side panels indicated by the numerals 15, which panels are secured together by the side seam flap 16. The bottom closure portion, generally indicated by the numeral 12, is formed from the various rectangular and triangular panels indicated by the numerals 17 through 24. The top end closure, generally indicated by the numeral 13, is formed from the various rectangular and triangular panels indicated by the numerals 25 through 44. The score lines in the blank which divide the various panels from one another define fold lines that are produced when the blank is cut from the thermoplastic coated paperboard stock.

The top end closure 13 is formed with a pair of roof panel members which are inclined upwardly in the completed position and between which are disposed the inner triangular panels 26 and 36. One of the roof panel members is formed from the panels 30 and 31, and the other of the roof panel members is formed from the panels 40 and 41. A pair of triangular fold-back panels as 25 and 27, and 35 and 37, are disposed on opposite sides of each of the inner triangular panels 26 and 36, respectively. The inner triangular panel 36 and the adjacent fold-back panels 35 and 37 function as an extensible pouring spout 14 after the top end panels have been closed. The closure panels 25, 26 and 27 are provided on the upper end thereof with the inner rib panels 28 and 29. The inner closure panels 35, 36 and 37 are provided with the inner rib panels 38 and 39 on the upper ends thereof. The outer closure panels 30, 31, 40 and 41 are provided on the upper end thereof with the outer rib panels 32, 33, 42 and 43, respectively. The outer rib panels 32 and 33 are provided with the upwardly extended sealing panel 34. The outer rib panels 42 and 43 are provided with the upwardly extended sealing panel 44.

The container packaging machine illustrated in FIG. 1 and shown in detail in the aforementioned United States Patent 3,002,328 includes a magazine station for storing container blanks, and a squaring station where the blanks are formed into tubular shape. The base ends of the tubular blanks are then closed by a series of operations at a bottom closing station. The containers are then passed to a filling mechanism. The filled containers are then conveyed to a top closing station where the top closure panels are closed and sealed.

The selective top heating means of the present invention is adapted to be mounted in an operative manner at the top closing station of the packaging machine illustrated in FIG. 1 to heat certain inner and outer sealing areas on the top closure panels by hot air to a temperature sufficient to melt the polyethylene coating on these areas. The selective top heating means of the present invention does not contact the container top closure panels during a heating operation. As described in detail hereinafter, the sealing areas which are heated by the selective top heater are the inside surfaces of the sealing panels 34 and 44, and the outside surfaces of the inner rib panels 28, 29, 38 and 39.

The sealing areas are heated in a selective and accurate manner to a temperature sufficient to retain the polyethylene coating in a tacky state during the subsequent top closing operation. The tacky state occurs between 225–250 degrees Fahrenheit. Accordingly, the container top closure panels must be heated above 250 degrees Fahrenheit and maintained at that temperature to insure a tacky state until the panels are moved under a suitable cold metallic pressure closing means of the type shown and described in said United States Patent 3,002,328. The closing means puts the container top closure panels under cold pressure which drops the temperature below 225 degrees, thereby securing a complete seal of the top closure panels of the container.

As shown in FIGS. 1 through 4, the illustrative embodiment of the selective heating means of the present invention includes a hot air heater housing, generally indicated by the numeral 45. The hot air heater housing 45 is an elongated, tubular, horizontally extended member which is disposed over the usual container conveyor of the packaging machine. The hot air heater housing 45 is provided with a plurality of openings 46 along the lower side thereof that communicate with a plurality of heater heads, generally indicated by the numerals 47, 48, 49 and 50. The hot air heater housing 45 is provided along the lower side thereof with a front longitudinal flange 51 and a rear longitudinal flange 52. As best seen in FIGS. 2 and 3, the lead or front heater head 47 is provided with a pair of longitudinally extended flanges 53 and 54 along the upper side thereof which are adapted to be seated on the heater housing flanges 51 and 52 and to be secured thereto by a plurality of bolts 55. The heater heads 48, 49 and 50 are provided with similar flanges which are secured to the heater housing with similar bolts that have been marked with the same reference numerals followed by the small letters a, b and c, respectively. The detailed structure and function of the heater heads 47, 48, 49 and 50 are described in detail hereinafter.

A thermometer 56 is mounted on the front side of the heater housing 45 and is best seen in FIG. 3. The heater housing 45 is provided with the mounting flange 58 in which is formed a hot air inlet 57, shown in FIG. 2. The housing mounting flange 58 is connected in a detachable manner to the flange 59 of the hot air supply manifold 60 by means of a plurality of bolts 61. The hot air supply manifold 60 is formed as an elongated tube, and pivotally mounted in the rear end thereof is an adapter ball joint 63 that is mounted on the front end of a heat transfer tube 62. The rear end of the heat transfer tube 62 is mounted in a fixed manner on the inner side of the vertical mounting plate 64. The heat transfer tube 62 is fixed to the plate 64 by any suitable means, as by welding. The vertical mounting plate 64 is connected in a detachable manner to the upper vertical upper leg 65 of a support bracket. The support bracket further includes the horizontal leg 66 which is integral with the lower end of the bracket vertical leg 65, and the lower vertical leg 67 which is integral with the inner end of the horizontal leg 66. The bracket lower vertical leg 67 is connected in a detachable manner by means of the bolts 68 to the vertical frame wall 69 of the container packaging machine.

As shown in FIGS. 2 and 4, a hot air passage 70 is formed through the mounting plate 64 and an aligned hot air passage 71 is also formed through the bracket upper vertical leg 65, and these passages communicate with the outer end of the heat transfer tube 62. A heat gun, generally indicated by the numeral 72, is mounted in an operative manner on the outer side of the bracket upper vertical leg 65 by any suitable means. The heat gun 72 may be of any suitable type that is adapted to supply hot air at a line pressure of from 15 to 20 pounds per square inch to the transfer tube 62, through the passages 70 and 71. The pressure of the hot air drops as it is conveyed to the heater housing 45, and in the heater heads 47, 48, 49 and 50 the hot air pressure is approximately a half to one ounce per square inch. The heat transfer tube 62 is enclosed by the airtight flexible metal tubing 73. The front end of the tubing 73 is fixed to the rear end of the manifold 60 by any suitable means, as by welding. The rear end of the tubing 73 is connected similarly to the front end of the mounting plate 64 that is secured to the bracket upper vertical leg 65 by the bolts 74.

An important characteristic of the selective top heater of the present invention is that it is moved into a container for a predetermined period of time and then it is moved out of the container. This in-and-out movement of the heater may be accomplished when the container is disposed on a continuously moving conveyor in a packaging machine as well as when it is disposed on a conveyor that moves in a step-by-step manner. In the illustrative embodiment, the conveyor of the container packaging machine moves the containers in a step-by-step movement and the selective top heater is moved into a container while it is in a dwell position and then it is moved out of the container to permit it to be transferred to the next position. The top heater means may be supported for timed movement with a continuously moving conveyor by heater supporting means as illustrated in United States Patent No. 3,002,328. The heater housing 45 is constructed so that it will be removed from a container top when the packaging machine is completely stopped in order to prevent igniting of the container.

As shown in FIGS. 2 and 4, the hot air manifold 60 is supported in a pivotal manner by means of the pivot shaft 75 which is journalled in the horizontally disposed bearing member 76. The hot air manifold 60 is provided with the horizontally extended flanges 78 and 79 to which the bearing member 76 is connected by means of the bolts 77. The pivot shaft 75 extends outwardly beyond the ends of the bearing member 76 and the ends of this shaft are journalled in the spaced apart journal members 80 and 81 that are integral with the spaced apart, rearwardly extending support arms 82 and 83, respectively. The support arms 82 and 83 are provided with the integral outwardly extended horizontal mounting flanges 84 and 85, respectively, which are connected detachably to the machine frame wall flange 87 by means of the bolts 86. As shown in FIG. 2, the machine frame wall flange 87 is integral with the frame wall 69. The bearing number 76 is spaced apart from the hot air heater housing 45 and is positioned adjacent the rear end of the hot air manifold 60. The support arms 82 and 83 are interconnected by means of the horizontal plate 88 which rests on the frame wall flange 87.

FIGS. 2, 3 and 4 illustrate an actuator arm 89 which is adapted to pivot the hot air manifold 60 and the hot air heater housing 45 upwardly and downwardly about the pivot shaft 75. The upper end of the actuator arm 89 is integral with the bearing member 76 and extends downwardly and terminates in the clevis member 90. A cam follower 91 is mounted rotatably in the clevis 90 by means of the shaft 92.

As best seen in FIGS. 2 and 3, the cam follower 91 rollably engages a circular cam, generally indicated by the numeral 93, that is formed on the cam carrier body 94. The cam carrier body 94 is mounted on the main drive shaft 95 of the container packaging machine and is connected thereto by means of the key 96. The circular cam 93 is provided with a first cam area or surface 97 that extends approximately 135° from the starting end 98 about the circumference of the cam to the terminating end 99. The circular cam 93 further includes the second cam area 100 which extends from the end 99 of the first cam area about the circumference of the cam 93 to the starting end 98 of the first cam area.

It will be understood that the circular cam member 93 rotates in the counterclockwise direction, as viewed in FIG. 2, in time with the indexing of the container packaging machine. When the cam follower 91 rollably engages the surface 97, the hot air heater housing 45 is pivoted or advanced downwardly into an operative heating position so as to move one of the heater heads into the container 11 that is positioned below the housing and heat the aforedescribed selected sealing areas. When the container packaging machine indexes and the main drive shaft 95 again operates, the circular cam 93 is turned so as to engage the second cam area 100 with the cam follower 91 to retract or pivot the heater housing 45 upwardly to the dotted line position shown in FIG. 2, whereby the heater housing 45 is disposed above the container 11 and the container is then indexed to the next position. In FIG. 2, the advanced or operative heating position of the heater housing 45 is shown by the solid line position and the retracted or inoperative position is shown by the dotted line position indicated by the numeral 150. FIG. 2 also shows the heater housing actuator arm 89 in the solid line position it occupies when the heater housing 45 is advanced downwardly to the operative heating position. The numeral 151 indicates the dotted line position that the actuator arm 89 assumes when the heater housing 45 is retracted upwardly to the inoperative position 150. It will be understood that there is a slight clearance between the ball joint 63 and the hot air manifold 60 to permit the necessary rotation of the hot air manifold 60 about the ball joint 63.

If the container packaging machine is stopped during operation, the heater housing 45 is adapted to be swung upwardly to the extreme raised inactive position, shown by the dotted line position 152 in FIG. 2, so as to completely clear the container area to prevent burning of the containers. This movement of the heater housing 45 into an extreme inactive position is initiated by any suitable switch (not shown), in the machine control circuit. It will be understood that any suitable control circuit may be employed for the container packaging machine. The structure for raising the heater housing 45 to the extreme inactive position when the packaging machine is stopped, includes the lever arm 101 which is connected in a hinged manner at the rear end thereof to the clevis 102 by means of the pin 103. The clevis 102 is fixed to the upper end of the cylinder rod 104 of the air cylinder 105. The air cylinder 105 would be controlled by said switch in said suitable control circuit. The lower end of the air cylinder 105 is provided with a pair of trunnions 106 which are mounted rotatably between the spaced apart vertical bracket arms 107 and 108. The bracket arms 107 and 108 are integral with the vertical bracket plate 109 which is fixed to the machine frame wall 69 by means of the bolts 110.

The lever arm 101 is provided at the forward end thereof with the integral journal member 111 which is mounted rotatably on the one end of the pivot shaft 75. As shown in FIG. 4, the one end of the pivot shaft 75 is provided with the enlarged head 114. The pivot shaft 75 is retained in place by means of the bolt 113 that is threaded into the other end of the shaft, and the retainer washer 112. As shown in FIGS. 2 and 3, the lever arm 101 is provided with the vertical, downward extension 115 which has integral therewith the horizontal sidewardly extended arm 116. The horizontal arm 116 extends sidewardly toward the hot air manifold bearing member 76 and engages on the rear side thereof the downwardly extended leg 117 which is integral with the manifold bearing member 76. The leg 117 is connected to the arm 116 by means of the screw 147. In operation, the air cylinder 105 functions to always maintain the rod 104 in the solid line position shown in FIG. 2 so as to pivot the lever arm 101 to cause the roller 91 to maintain cam contact with the cam surfaces 97 and 100. If the packaging machine stops, the air pressure is reversed in the cylinder 105 and the clevis moves to the dotted position 118, the actuator arm 89 moves to the dotted line position 153 and the roller 91 leaves the cam 93, and the heater housing 45 is lifted upwardly to the extreme raised inoperative position 152 above the containers to prevent discharge of the high temperature air on the containers.

The front heater head 47 is shown in detail in FIGS. 5 through 9. The heater head 47 includes the upper chamber 119 which extends longitudinally and is provided with the vertical side walls 120 and 121 and the vertical end walls 122 and 123. The heater head side walls 120 and 121 are provided with a plurality of downwardly and outwardly directed hot air ports 124 and 125, respectively. As shown in FIG. 5, when the front heater head 47 is lowered into a container 11, the hot air discharge ports 124 and 125 are disposed adjacent the inner sealing areas 34 and 44, respectively.

As best seen in FIGS. 5 and 6, the heater head 47 further includes the spaced apart lower end hot air chambers 126 and 127 which communicate with the upwardly disposed hot air chamber 119. As best seen in FIG. 5, the end chambers 126 and 127 are provided with the inwardly facing, spaced apart, angularly shaped inner walls 128 and 129 in which are formed a plurality of hot air discharge ports 130 and 131, respectively. The heater head walls 128 and 129 are adapted to be disposed along the outer surfaces of the inner rib sealing panels 28 and 29, and 38 and 39, for selective heating of the same when the front heater head 47 is lowered into the upper end of a container 11. The lower end chamber 126 is enclosed by the bottom wall 132 and the vertical side walls 133 and 134. The other lower end chamber 127 is similarly enclosed by the bottom wall 135 and the vertical side end walls 136 and 137. The intermediate heater heads 48 and 49 are constructed in the identical manner as the aforedescribed front heater head 47.

FIG. 10 shows a modified heater head 148 wherein the hot air discharge ports 130 have been replaced with an elongated slot 149 on each side of the angularly shaped wall 128. The hot air discharge ports 124, 125 and 131 may also be formed as slots similar to slot 149. The elongated slots 149 discharge hot air on the container sealing areas. The heater head 148 is made similar to the heater head 47 and the similar parts are marked by the same reference numerals followed by the small letter $d$.

FIGS. 11, 12 and 13 illustrate the details of the terminal or rear end heater head 50 which is adapted to apply hot air to the complete top closing rib area of the container. It is the purpose of the heater head 50 to prevent cooling of the heated closure members as the container is moved into operative engagement with the closing jaws 146.

As best seen in FIG. 11, the heater head 50 includes the hot air chamber 138 which is formed by the longitudinal, vertical side walls 139 and 140, and the vertical end walls 141 and 142. The hot air chamber 138 is enclosed on the lower end thereof by the sloping bottom wall 143 which slopes upwardly and forwardly toward the last heater head 49. Formed in the heater head bottom wall 143, is a plurality of hot air discharge ports 144 and 145 which are disposed in the shape of a V, with the apex disposed away from the rear end of the heater head 49 which is disposed adjacent the closing heads of the packaging machine, as shown in FIGS. 3 and 4.

The selective hot air heating means of the present invention is illustrated as including three of the heater heads, but it will be understood that one or more of the heater heads may be used together with the terminal heater head 50. In the disclosure, the three heater heads 47, 48 and 49 would be simultaneously moved downwardly into the upper ends of three containers 11 after the conveyor of the packaging machine has indexed the containers forwardly to the proper positions. By having more than one heater head, it is possible to index the conveyor system at a faster rate and to increase production.

FIG. 5 schematically illustrates how the heater heads 47, 48 and 49 are moved downwardly into proximity with the sealing areas 34, 44, 28, 29, 38 and 39 on the closure members of a container 11. The air is maintained at a temperature in the housing 45 of about 850 degrees Fahrenheit so that it will be sufficiently hot when it emerges from the ports in the heater heads to fuse the thermoplastic coating on the sealing areas. The heater heads do not engage the sealing surfaces of the container closure members and are spaced apart therefrom approximately one-eighth of an inch. The pressure of the hot air in the heater heads is in the range of from a half to one ounce per square inch. If the hot air pressure is below this range the heater heads may be disposed closer to the sealing areas than one-eighth of an inch without harmful effects on the container. The heater heads dwell in the containers 11 about one-half second and it has been found that the sealing surface temperature in this time is raised to a temperature in excess of 250 degrees Fahrenheit. When a container 11 is indexed from the position under the heater head 49 to the position under the heater head 50, the sealing surfaces are maintained in the heated condition by the heater head 50 for further movement into suitable closure members indicated by the numeral 146 in FIG. 3. It will be understood that any suitable closure members may be use, as for example, the closure members shown in the aforementioned U.S. Patent No. 3,002,328.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. A heating apparatus for use on a paper-board container packaging machine for heating thermoplastic coated sealing surfaces of container closure elements, comprising:
   (a) heater means pivotally mounted on the packaging machine and connected to a heat source;
   (b) power means mounted on said machine and connected to said heater means for selective movement of the heater means between a lowered operative heating position adjacent the sealing surfaces and a first raised inoperative heating position, or to a second raised inactive heating position;
   (c) said heater means comprises a hot air housing adapted to extend into the container when the heater means is in the lowered operative heating position;
   (d) said heat source comprises a source of hot air under pressure;
   (e) said heater means further includes at least one unitary heater head mounted on said hot air housing;
   (f) said heater head is provided with an upper hot air chamber and a pair of spaced apart lower hot air chambers communicating with said upper hot air chamber;

(g) each of said hot air chambers is provided with elongated openings for discharging hot air on the sealing surfaces of the closure elements of the container with a separate elongated opening being disposed adjacent each of the said sealing surfaces;

(h) said upper hot air chamber being disposed between a pair of inwardly facing sealing surfaces when the heater means is in the lowered operative heating position for discharging hot air on said last mentioned sealing surfaces; and (i) said spaced apart lower hot air chambers being disposed adjacent outwardly facing sealing surfaces when the heating means is in the lowered operative heating position for discharging hot air onto said outwardly facing sealing surfaces.

2. A heating apparatus for use on a container packaging machine for heating thermoplastic coated sealing surfaces of container closure elements, comprising:

(a) heater means pivotally mounted on the packaging machine and connected to a heat source;

(b) power means mounted on said machine and connected to said heater means for selective pivoting of the heater means between a lowered operative heating position adjacent the sealing surfaces and a first raised inoperative heating position, or to a second raised inactive heating position;

(c) said power means includes an actuator lever connected to said heater means;

(d) a power operated cam means operatively engaged with said actuator lever for rocking said lever to move said heater means between the lowered operative heating position and the first raised inoperative heating position; and, (e) a power cylinder connected to said actuator lever for rocking said actuator lever to a position disengaged from said cam means to pivot the heater means to the second raised inactive heating position.

3. The heating apparatus as defined in claim 1, wherein:

(a) said heater means further includes a second heater head having a plurality of hot air discharge ports for discharging hot air onto the container closure elements to maintain the heat level thereof when the containers are moved from under the first-named heater head to a succeeding closing operation.

4. The heating apparatus as defined in claim 1, wherein:

(a) said heater means contains a plurality of heater heads constructed similar to the first-named heater head and adapted to function in the same manner as the first-named heater head.

5. In a container packaging machine including means for closing the closure elements of thermoplastic coated containers, a conveyor means for carrying the containers through the machine to the closing means, and a power drive shaft for operating the machine; a heating apparatus for heating the thermoplastic coated sealing surfaces of container closure elements, comprising:

(a) a heater means pivotally mounted on the packaging machine, adjacent said closing means, and movable over containers on the conveyor;

(b) means mounted on said machine and connected to said heater means for selective pivoting of the heater means between a lower operative heating position adjacent the sealing surfaces of the closure elements of a container on a conveyor and a first raised inoperative heating position above the container or a second raised inactive heating position above the container;

(c) said means for pivoting the heater means comprises an actuator lever connected to the heater means;

(d) cam means operated by said power shaft and adapted to rock said actuator lever to move said heater means between the lower operative heating position and the first raised inoperative heating position;

(e) a power cylinder mounted on said machine and operatively connected to said actuator lever for rocking the lever to a position disengaged from said cam means to pivot the heater means to the second raised inactive heating position and to maintain the actuator lever in operative engagement with said cam means when the heater means is not in the second raised inactive heating position;

(f) said heater means comprises a hot air housing adapted to extend into a container on the conveyor when the heater means is in the lower operative position;

(g) said heater means is connected to a source of hot air under pressure for discharging the hot air into the sealing surfaces of the container closure elements;

(h) said heater means further includes at least one heater head mounted on the said hot air housing;

(i) said heater head is provided with an upper hot air chamber and a pair of spaced apart lower hot air chambers; and (j) each of said hot air chambers is provided with hot air discharge means for discharging hot air on the sealing surfaces of the closure elements of a container on the conveyor.

6. In a container packaging machine including means for closing the closure elements of thermoplastic coated containers, a conveyor means for carrying the containers through the machine to the closing means, and a power drive shaft for operating the machine; a heating apparatus for heating the thermoplastic coated sealing surfaces of container closure elements, comprising:

(a) a heater means pivotally mounted on the packaging machine, adjacent said closing means, and movable over containers on the conveyor; and, (b) means mounted on said machine and connected to said heater means for selective pivoting of the heater means between a lower operative heating position adjacent the sealing surfaces of the closure elements of a container on a conveyor and a first raised inoperative heating position above the container or a second raised inactive heating position above the container;

(c) said means for pivoting the heater means comprises an actuator lever connected to the heater means;

(d) cam means operated by said power shaft and adapted to rock said actuator lever to move said heater means between the lower operative heating position and the first raised inoperative heating position; and, (e) a power cylinder mounted on said machine and operatively connected to said actuator lever for rocking the lever to a position disengaged from said cam means to pivot the heater means to the second raised inactive heating position and to maintain the actuator lever in operative engagement with said cam means when the heater means is not in the second raised inactive heating position.

7. The heating apparatus as defined in claim 5, wherein:

(a) said hot air discharge means comprises a plurality of ports formed in the heater head and disposed in groups with each group being disposed to discharge hot air on a predetermined sealing surface.

8. The heating apparatus as defined in claim 5, wherein:

(a) said hot air discharge means comprises a plurality of elongated openings formed in said heater head with a separate elongated opening being disposed adjacent each of the said sealing surfaces.

9. The heating apparatus as defined in claim 5, wherein:
 (a) said heater means contains a plurality of heater heads constructed similar to the first-named heater head and adapted to function in the same manner as the first-named heater head.

10. The heating apparatus as defined in claim 5, wherein:
 (a) said upper hot air chamber is disposed between a pair of inwardly facing sealing surfaces when the heater means is in the lowered operative heating position for discharging hot air on said last mentioned sealing surfaces; and,
 (b) said spaced apart lower hot air chambers are disposed adjacent outwardly facing sealing surfaces when the heating means is in the lowered operative heating position for discharging hot air onto said outwardly facing sealing surfaces.

11. In a container packaging machine including means for closing the closure elements of thermoplastic coated containers, a conveyor means for carrying the containers through the machine to the closing means, and a power drive shaft for operating the machine; a heating apparatus for heating the thermoplastic coated sealing surfaces of container closure elements, comprising:
 (a) a hot air housing disposed over said conveyor;
 (b) a hot air manifold connected to said heater housing;
 (c) means pivotally supporting said manifold on the machine;
 (d) means connecting said hot air manifold to a source of hot air under pressure;
 (e) means mounted on said machine and connected to said hot air manifold for selective pivoting of the manifold and hot air housing to move the housing between a lower operative heating position adjacent the sealing surfaces of the closure elements of a container on a conveyor and a first raised inoperative heating position above the container or a second raised inactive heating position above the container;
 (f) said means for pivoting a manifold comprises an actuator lever connected at one end thereof to the means for pivotally supporting said manifold on the machine and provided at the other end with a cam follower;
 (g) a cam operatively mounted on said machine drive shaft and engagable with said cam follower for pivoting the housing between the heating position and the first raised inoperative heating position;
 (h) a second lever pivotally mounted on said machine and having one end thereof connected to the means for pivotally supporting said manifold on the machine; and
 (i) a power cylinder mounted on said machine and operatively connected to the other end of said second lever and operative to move the second lever in one direction to raise the housing to said inactive heating position, and in the other direction to maintain said cam follower in operative engagement with said cam.

12. The heating apparatus as defined in claim 11, wherein:
 (a) said hot air housing is provided with a hot air temperature indicating means.

13. The heating apparatus as defined in claim 11, wherein:
 (a) said hot air housing includes at least one heater head mounted on the side facing said conveyor;
 (b) said heater head is provided with an upper hot air chamber and a pair of spaced apart lower hot air chambers; and,
 (c) each of said hot air chambers is provided with hot air discharge means for discharging hot air on the sealing surfaces of the closure elements of a container on the conveyor.

14. The heating apparatus as defined in claim 13, wherein:
 (a) said upper hot air chamber is disposed between a pair of inwardly facing sealing surfaces when the heater means is in the lowered operative heating position for discharging hot air on said last mentioned sealing surfaces; and,
 (b) said spaced apart lower hot air chambers are disposed adjacent outwardly facing sealing surfaces when the heating means is in the lowered operative heating position for discharging hot air onto said outwardly facing sealing surfaces.

15. The heating apparatus as defined in claim 14, wherein:
 (a) said hot air housing includes a plurality of heater heads constructed similar to the first-named heater head and adapted to function in the same manner as the first-named heater head.

16. The heating apparatus as defined in claim 14, wherein:
 (a) said hot air housing further includes a second heater head having a plurality of hot air discharge ports for discharging hot air onto the container closure elements to maintain the heat level thereof when the containers are moved from under the first-named heater head to a succeeding closing operation.

References Cited by the Examiner

UNITED STATES PATENTS

| | | | |
|---|---|---|---|
| 2,926,474 | 3/1960 | Morrison et al. | 53—373 |
| 3,140,571 | 7/1964 | Dorper et al. | 53—373 X |
| 3,212,413 | 10/1965 | Allen et al. | 53—373 X |
| 3,248,841 | 5/1966 | Heffelfinger et al. | 53—375 X |

TRAVIS S. McGEHEE, *Primary Examiner.*